United States Patent [19]

Harvey, II et al.

[11] 4,102,764
[45] Jul. 25, 1978

[54] HIGH PURITY SILICON PRODUCTION BY ARC HEATER REDUCTION OF SILICON INTERMEDIATES

[75] Inventors: Francis J. Harvey, II, Murrysville; Maurice G. Fey, Plum Borough, both of Pa.

[73] Assignee: Westinghouse Electric Corp., Pittsburgh, Pa.

[21] Appl. No.: 755,383

[22] Filed: Dec. 29, 1976

[51] Int. Cl.² .......................... B01K 1/00; C01B 33/02
[52] U.S. Cl. ..................................... 204/164; 423/348; 423/350
[58] Field of Search ............................... 423/348–350; 204/164

[56] References Cited

U.S. PATENT DOCUMENTS

| 732,410 | 6/1903 | Homan | 423/348 |
| 2,904,404 | 9/1959 | Ellis | 423/350 |
| 2,955,024 | 10/1960 | Smith | 423/350 |
| 2,955,966 | 10/1960 | Sterling | 204/164 X |
| 3,325,314 | 6/1967 | Allegretti | 423/350 X |
| 3,522,015 | 7/1970 | Maniero et al. | 250/530 X |
| 3,704,094 | 11/1972 | McClincy et al. | 423/350 |
| 3,963,838 | 6/1976 | Setty et al. | 423/349 |

FOREIGN PATENT DOCUMENTS

| 651,374 | 10/1962 | Canada | 423/350 |
| 1,041,483 | 10/1958 | Fed. Rep. of Germany | 423/350 |
| 1,129,145 | 7/1960 | Fed. Rep. of Germany | 423/350 |
| 855,913 | 12/1960 | United Kingdom | 423/350 |

Primary Examiner—F.C. Edmundson
Attorney, Agent, or Firm—L. P. Johns

[57] ABSTRACT

A process for converting silicon intermediates to high purity silicon by an arc heater characterized by the thermal reduction of one of several potential purified silicon intermediate compounds using an arc heater as the reduction energy source and using hydrogen as the reductant.

6 Claims, 4 Drawing Figures

HIGH PURITY SILICON PRODUCTION BY ARC HEATER REDUCTION OF SILICON INTERMEDIATES

BACKGROUND OF THE INVENTION

1. Field of the Invention

This invention relates to a process for the production of high purity silicon by arc heater reduction of silicon intermediates.

2. Description of the Prior Art

The commercial development of electric power generation based on silicon photovoltaic devices requires a substantial decrease in the production costs of high purity silicon as well as an increase in production capacity thereof. Heretofore the overall process in the production of high purity silicon consisted of four steps including (1) reduction of silica with carbon to produce metallurgical grade silicon, (2) conversion of metallurgical grade silicon to one or more intermediate compounds such as trichlorosilane by reaction with a hydrogen halide such as hydrogen chloride, (3) purification of the intermediate compounds, and (4) decomposition of the intermediate compounds to polycrystalline silicon. The final step (4) in the process is carried out in a reactor containing resistance heated silicon rods in which hydrogen and the intermediate compounds are introduced. The intermediate compounds react with the hydrogen, producing polycrystalline silicon which is deposited on the resistance heated rods. This step is very inefficient since it must be carried out at temperatures below the melting point of silicon, which results in a low yield of silicon. At higher temperatures, the halosilanes, i.e., the fluorosilanes, chlorosilanes, and iodosilanes, become much less stable and thus a higher process yield would result. Furthermore, the prior art decomposition step is a batch process in which the reactor must be shut down and opened to remove the deposited silicon which causes a decrease in the overall production rate for a given installation period.

SUMMARY OF THE INVENTION

It has been found in accordance with this invention that the foregoing process may be overcome by a process for the production of high purity silicon comprising the steps of (a) reducing silica with an element selected from the group consisting of carbon, aluminum, and magnesium, to produce metallurgical grade silicon comprising silicon and impurity compounds, (b) reacting the metallurgical grade silicon with a hydrogen halide to produce impurity compounds and intermediate silicon compounds selected from the group consisting of $SiH_a$, $SiH_bY_c$, and $SiY_d$, where Y is a halide and a, b, c and d are whole integers, (c) purifying the intermediate silicon compounds by removal of the impurity compounds, and (d) reducing the intermediate silicon compounds in the presence of hydrogen at a temperature ranging from about 1705°–2500° C.

The advantage of the process of this invention is that the process is carried out at higher temperatures which result in substantially increased yield of silicon and in a continuous manner which increases the production rate.

DESCRIPTION OF THE PREFERRED EMBODIMENT

Figure 1:
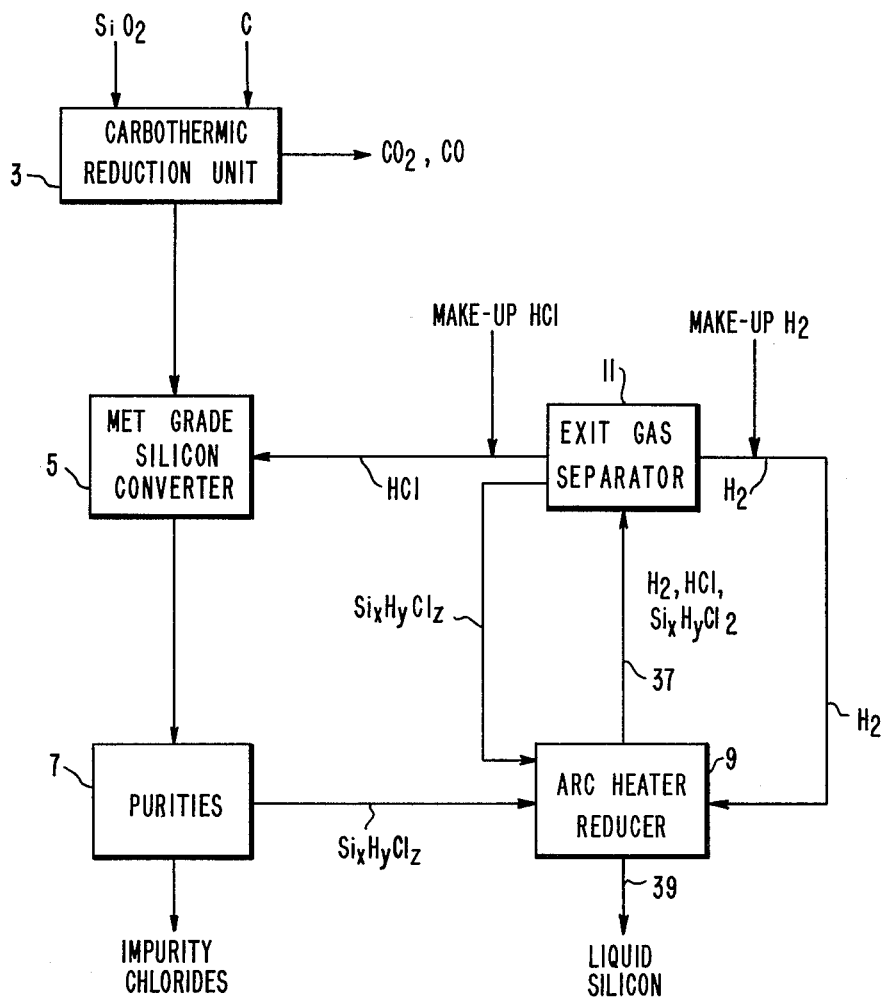
FIG. 1 is a schematic representation of a process for producing high purity silicon involving an arc heater reduction.

In accordance with this invention the process provides for the reduction of silicon bearing ore to high purity silicon which is useful in silicon solar cells. Basically the process comprises a four-step procedure including the steps of:

(a) reducing silicon bearing material with an element selected from the group consisting of aluminum, carbon, and magnesium, to produce a metallurgical grade silicon comprising silicon and impurities, (b) reacting the metallurgical grade silicon with a hydrogen halide to produce impurity compounds and intermediate silicon compounds selected from the group consisting of $SiH_a$, $SiH_bY_c$, and $SiY_d$, where Y is a halide including bromine, chlorine, iodine, and fluorine, and a, b, c, and d are whole integers, (c) purifying the intermediate silicon compounds and impurities, and (d) reducing the intermediate compounds in the presence of hydrogen at a temperature above the melting point of silicon.

The apparatus, by which the process of this invention is preferably performed, includes a carbothermic reduction unit 3 (FIG. 1), a converter 5, a purifier 7, an arc heater reducer 9, and a gas separator 11.

The carbothermic reduction unit 3 is adapted to convert silicon bearing material such as ore in the form of silicon dioxide ($SiO_2$) in combination with other minerals of varying combinations, depending upon the location of the source of the ore. The reduction unit 3 is preferably an electric arc furnace operating at a temperature ranging of from 2500° to about 2800° C. The reducing material is an element of having a high affinity for oxygen, such as aluminum, carbon, and magnesium which are used alone and not as mixtures. The preferred material is carbon so that the carbothermic reduction is substantially indicated in formula 1:

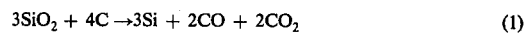

$$3SiO_2 + 4C \rightarrow 3Si + 2CO + 2CO_2 \quad (1)$$

The resulting silicon is metallurgical grade silicon which is about 98% pure depending on the carbon and ore source, and includes up to about 2% impurities, such as silicon carbide.

The second step of the process is performed in a suitable reactor, such as a fluidized bed or a countercurrent shaft furnace, in which the reaction temperature ranged from about 200°–500° C, and preferably 300° C. In the converter 5 metallurgical grade silicon reacts with a hydrogen halide to produce an intermediate silicon compound selected from the group consisting of $SiH_a$, $SiH_bY_c$, and $SiY_d$, where Y is a halide including chlorine, bromine, iodine, and fluorine. The halide preferably used in hydrogen chloride (HCl) where the principal reaction is in accordance with the formula:

$$Si + 3HCl \rightarrow SiHCl_3 + H_2 \quad (2)$$

Although the principal product is trichlorosilane (SiHCl$_3$) other chlorosilanes, chlorides, and silanes, such as SiH$_4$, SiH$_3$Cl, SiH$_2$Cl$_2$, SiCl$_4$, SiCl$_3$, SiCl$_2$, SiCl, and SiH, as well as impurity chlorides such as FeCl$_3$, will form.

The third step of the process involving purification of the trichlorosilane from impurity chlorides occurs in the purifier 7 which preferably comprises a fractional distillation column or filter in which the several compounds derived from the converter 5 are separated in a well-known manner. In this step the purification of trichlorosilane involves the fractional distillation of chloride mixtures from the formula 2. In this manner impurity chlorides, such as AlCl$_3$, and FeCl$_3$, are readily removed from the trichlorosilane. Thus, the impurities that reduce the efficiency of silicon solar cells including aluminum, iron, titanium, and vanadium are eliminated from the silicon.

In accordance with this invention the arc heater reducer 9 is operated at a temperature above the melting point of silicon in order to increase the yield of silicon and to involve a continuous operation to increase production rate. The arc heater operates at a temperature range from about 1705°–2500° K. As a result, the product silicon is in the liquid state which is more conductive to being processed into single crystals. A simplified formula of the reaction within the arc heater reducer 9 is as follows:

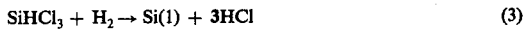

$$\mathrm{SiHCl_3 + H_2 \rightarrow Si(l) + 3HCl} \qquad (3)$$

In view of the high temperature range of operation any other chlorosilane or chloride is also reduced by the hydrogen in a similar manner. For that reason it is highly desirable to eliminate impurity chlorides in the preceding step of purifier 7.

The arc heater reducer 9 is an arc heater based reactor in which an arc heater provides the energy for the reaction incurred in formula 3. Accordingly, the chlorohydro silane may be introduced directly into the arc heater or into a metallurgical container communicating with the arc heater and into which arc heated gases are projected into the container. A suitable arc heater for use herein is that disclosed in the U.S. Pat. No. 3,832,519, issued Aug. 27, 1974, entitled "Arc Heater With Integral Fluid And Electrical Duct And Quick Disconnect Facility", of which the inventors are Charles B. Wolf, Maurice G. Fey, and Frederick A. Azinger, Jr. Because of the full disclosure in that patent the description of the arc heater reducer 9 is limited herein to the basic structure and operation. The arc heater reducer 9 is a single-phase, self-stabilizing AC device capable of power levels up to about 3500 kilowatts or up to 10,000 kilowatts for a three-phase plant installation. For the practice of this invention it is preferred that three arc heaters be provided, one for each of the three phases of the AC power supply.

Figure 2:
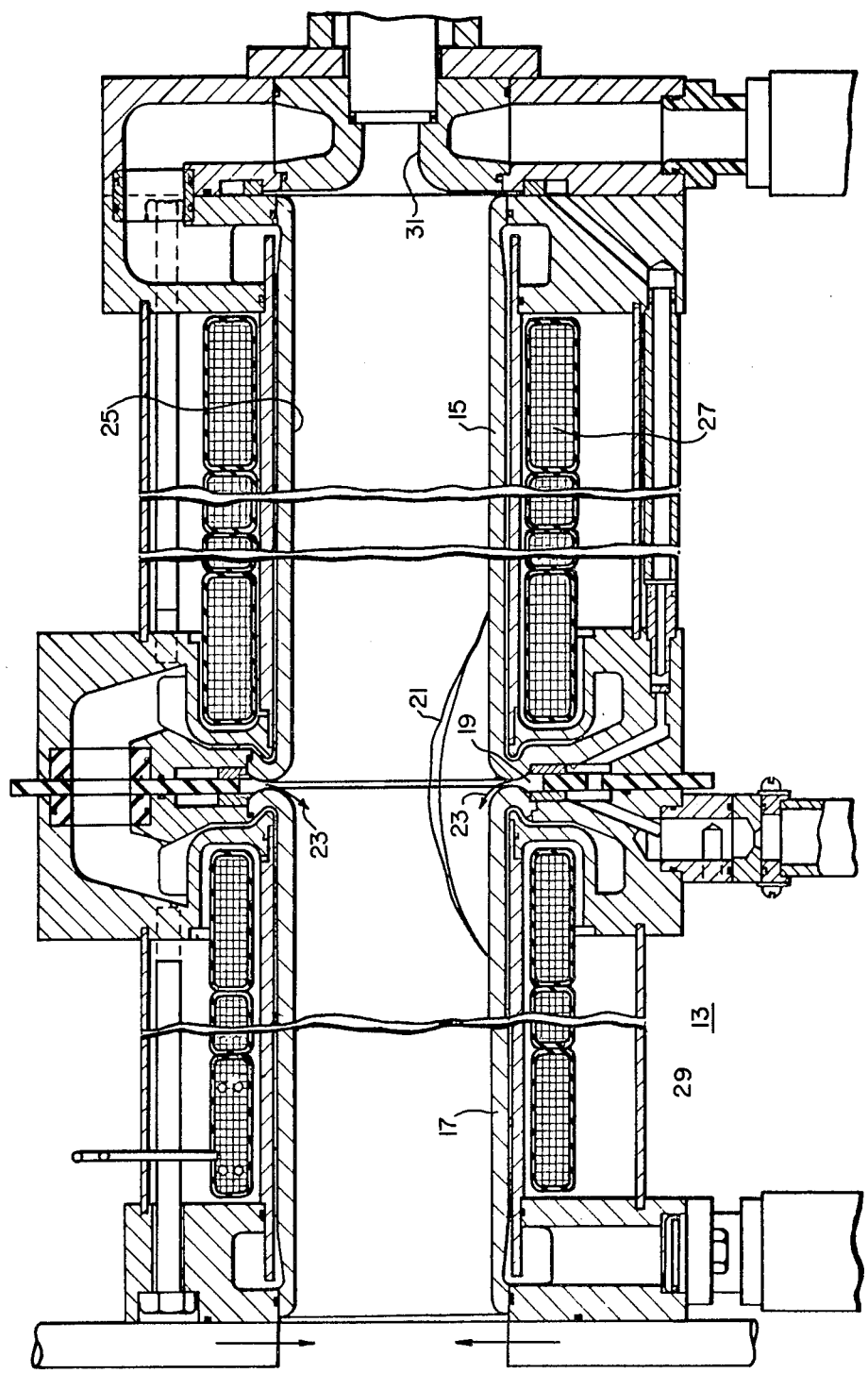
FIG. 2 is a view partially in section and partially in elevation showing an arc heater apparatus according to the preferred embodiment thereof.

As shown in FIG. 2, an arc heater generally indicated at 13 is part of the arc heater reducer 9 (FIG. 1) which will be described more fully hereinbelow. The arc heater 13 includes two annular copper electrodes 15, 17 which are spaced at 19 about one millimeter to accommodate the line frequency power source of about 4 kV. An arc 21 is initiated in the space or gap 19 and incoming feed stock gas, indicated by the arrow 23 immediately below the arc from the gap into the interior of the arc chamber 25. The arc 21 rotates at a speed of about 1,000 rpm by interaction of the arc current (several thousand amps AC) with a DC magnetic field set up by internally mounted solenoid coils 27, 29. The velocities yield a very high operating efficiency for equipment of this type. In addition to the feed stock gas 23, a secondary feed stock gas can be introduced at an upstream inlet 31, or axially into the chamber 25. Exit enthalpies ranging from, for example, up to about 15,000 BTU per pound when operated on hydrogen are easily obtained at good thermal efficiencies at the exit end 33 of the arc chamber. The feed stock gas 23, introduced at the gap 19 and inlet 31, is hydrogen, or a mixture of hydrogen and argon gas.

Figure 3:
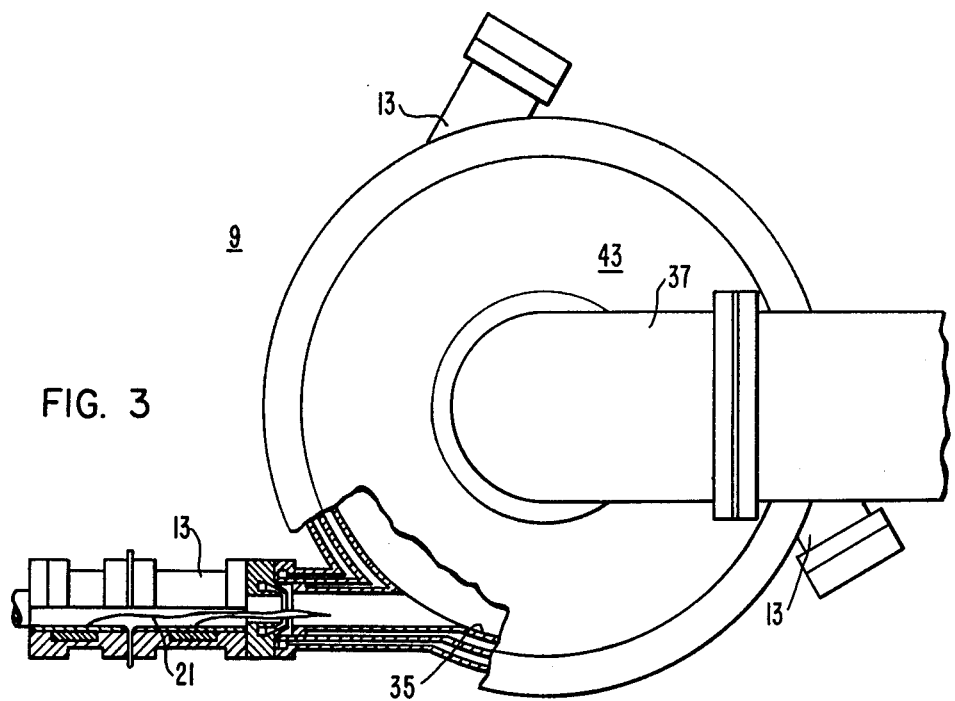
FIG. 3 is a plan view partly in section of the reactor having three arc heaters.
Figure 4:
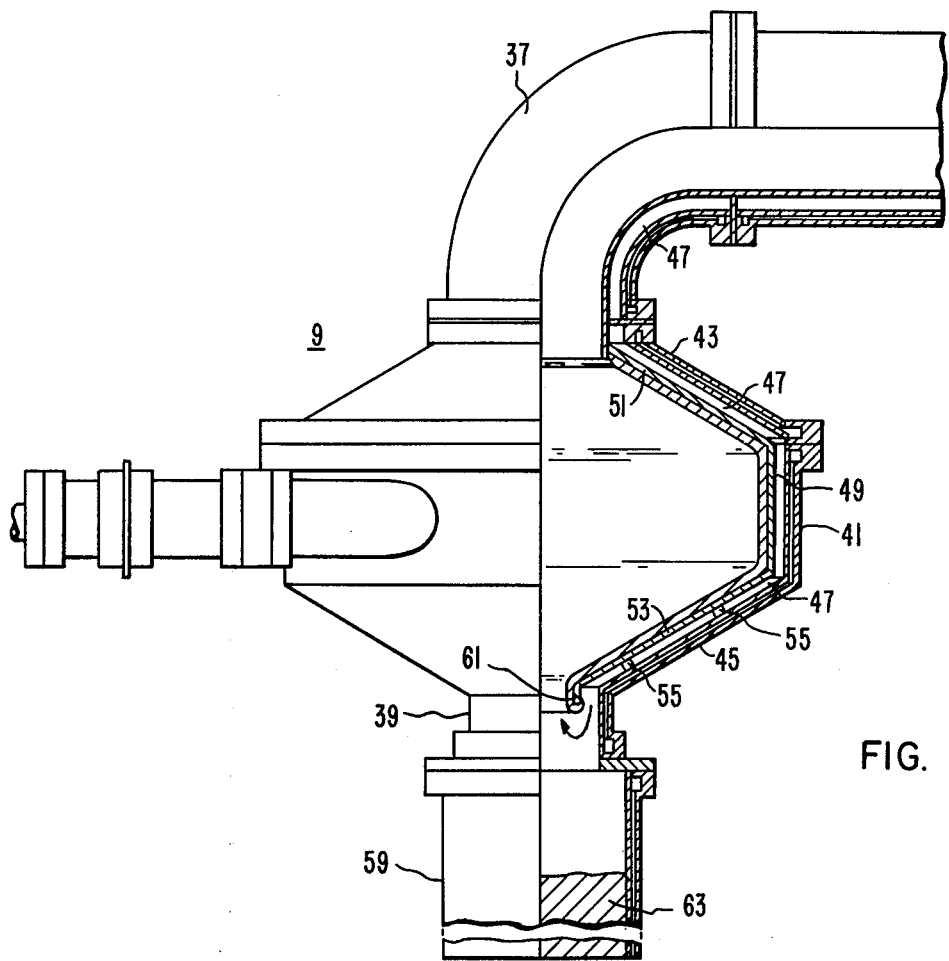
FIG. 4 is a vertical view taken on line IV—IV of FIG. 3.

As shown in FIGS. 3 and 4, the arc heaters 13 are connected to a centrifugal or plasma chamber 35 tangentially. The chamber 35, together with the arc heaters 13, comprise the arc heater reducer 9. The chamber 35 is preferably cylindrical to enhance centrifugal separation of the light and heavy co-products of the reactions occurring, whereby the lighter gaseous products such as hydrogen chloride (formula 3), leave the chamber 35 via an upper outlet conduit 37 while the heavier element, liquid silicon, exits through a lower outlet conduit 39.

The chamber 35 is contained between a peripheral wall 41 and opposite end walls 43, 45. The upper end wall 43 is preferably tapered upwardly from the peripheral wall 41 and joins the lower end of the upper outlet conduit 37 so that the co-product gases are more readily directed from the centrifugal zone within the chamber 35 toward the outlet conduit. Similarly, the lower end wall 45 is inclined downwardly and joins the outlet conduit 39 which communicates with an ingot mold or collection chamber (not shown) for the silicon formed during the reaction period. The peripheral walls 41 and end walls 43, 45 are preferably cooled by water jacket means 47 of a conventional nature. In addition, the chamber 35 comprises an inner wall or liner 49 which is substantially concentrically disposed and spaced from the peripheral wall 41 and the end walls 43, 45. The inner wall 49 preferably comprises upwardly and inwardly inclined upper walls portions 51 and a lower wall portion 53. The spacing between the outer walls 41, 43, 45 and the inner wall portions 49, 51, 53 is maintained in a suitable manner such as by space support rings 55.

The inner wall means including the wall and wall portions 49, 51, 53 are sustained at high wall temperatures. As the liquid silicon separates centrifugally from the cool product gas which leaves the arc chamber 25, the silicon deposits on the wall and wall portions 49, 51, 53 to form a solidified silicon layer 57 having a thickness which is established by heat transfer equilibrium which thickness is limited to several inches. The inner walls 49, 51, 53 are cooled by radiation to the water jacket means 47. The thickness of the solidified silicon layer 57 is dependent upon a temperature gradient through the layer as well as the thermal equilibrium status within the chamber including the zone between the inner wall 49 and the peripheral wall 41. Accordingly, the surface of the silicon layer 57 farthest from the inner wall 49 remains liquid and runs down the layer surface and exits at the lower end thereof into an ingot mold 59. For that purpose, the lower end of the inner wall 49 is preferably provided with a drip flange 61 extending into the outlet conduit 39, thereby preventing the molten silicon from depositing on or contacting the walls forming the outlet conduit 39. Thus, a silicon ingot 63 forms in the ingot mold 51.

As shown in FIG. 1, the gaseous co-products which leave the centrifugal chamber 35 via the outlet conduit 37 include hydrogen chloride, hydrogen and chlorosilane ($Si_xH_yCl_z$) which are carried to the exit gas separator 11, such as a distillate column where the separated HCl is redirected to the converter 5 together with any necessary makeup hydrogen chloride. The separated hydrogen together with any necessary makeup hydrogen is again returned to the arc heater reducer 9. Finally, the separated chlorosilane is returned to the reducer for reuse as indicated in the above reaction.

Accordingly, the process of this invention provides for the production of silicon involving the reduction of a halosilane such as trichlorosilane by hydrogen. The reduction step is most conveniently carried out in a reactor in which an arc heater is used as the heat source. Finally, the temperature of the reduction step is high enough that silicon is in the liquid state and other co-products are in the gaseous state.

What is claimed is:

1. A process for the production of high purity silicon comprising the steps of:
    (a) providing an arc heater having spaced electrodes and forming an arc chamber communicating with a reaction chamber,
    (b) striking an electric arc in an axial gap between the electrodes,
    (c) introducing an arc gas selected from the group consisting of hydrogen and a mixture of hydrogen and an inert gas through the gap to provide an elongated arc stream extending into the reaction chamber, and
    (d) feeding into the arc stream a quantity of an intermediate silicon compound selected from the group consisting of $SiH_a$, $SiH_bY_c$ and $SiY_d$, where Y is a halide including Cl, Br, I, F, and where a, b, c, and d are whole integers, to react with the arc gas to produce reaction products comprising liquid silicon.

2. The process of claim 1 wherein in step (d) the hydrogen halide is selected from the group consisting of hydrogen fluoride, hydrogen chloride, hydrogen bromide, and hydrogen iodide.

3. The process of claim 1 wherein in step (d) the hydrogen halide is hydrogen chloride.

4. The process of claim 1 wherein in step (a) the temperature ranges from about 1705°–2500° K.

5. The process of claim 1 wherein in step (d) the intermediate silicon compounds are selected from the group consisting of $SiH_4$, $SiH_3Cl$, $SiH_2Cl_2$, $SiHCl_3$, $SiCl_4$, $SiCl_3$, $SiCl_2$, $SiCl$, and mixtures thereof.

6. The process of claim 1 wherein a mixture of impurity halides and any unreacted intermediate silicon compounds are recycled through a separator and the intermediate silicon compounds are returned to step (a).

* * * * *